Figure 1:
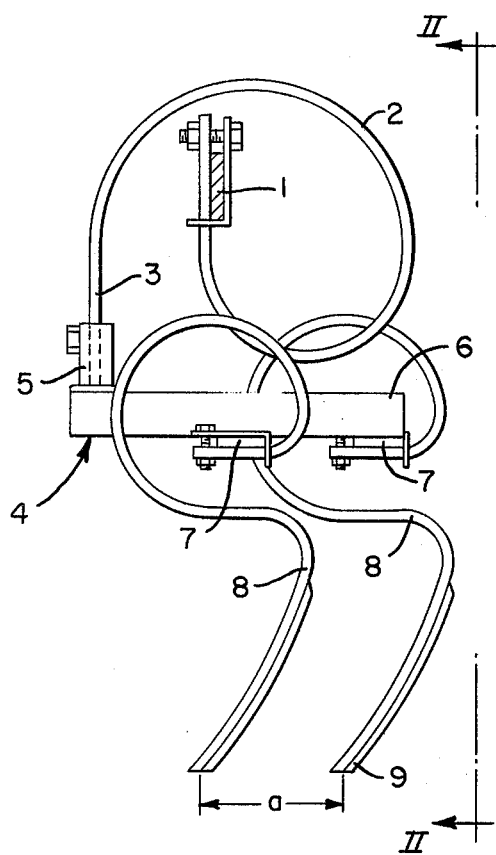

United States Patent [19]

Guttler

[11] 4,079,790

[45] Mar. 21, 1978

[54] CULTIVATING IMPLEMENT FOR AGRICULTURAL SOIL

[76] Inventor: Fritz Güttler, Drosselweg 5, 7315 Weilheim, Teck, Germany

[21] Appl. No.: 667,467

[22] Filed: Mar. 17, 1976

[30] Foreign Application Priority Data

Mar. 17, 1975  Germany ............................. 2511563

[51] Int. Cl.² ............................................. A01B 35/24
[52] U.S. Cl. .................................... 172/643; 172/707
[58] Field of Search ................ 172/142, 643, 707, 708

[56] References Cited

U.S. PATENT DOCUMENTS

| | | | |
|---|---|---|---|
| 248,373 | 10/1881 | Whipple ................................. | 172/643 |
| 724,175 | 3/1903 | Fuller ................................. | 172/707 X |
| 3,921,726 | 11/1975 | Connor et al. .................... | 172/707 X |

FOREIGN PATENT DOCUMENTS 89,393  6/1937  Sweden ................................ 172/142

*Primary Examiner*—Richard T. Stouffer
*Attorney, Agent, or Firm*—Craig & Antonelli

[57] ABSTRACT

A cultivating implement for agricultural soil, especially a harrow for seedbed preparation which includes a common carrier and resilient harrow teeth attached to a frame element. The harrow teeth are arranged at least in pairs at the common carrier with a resilient mounting construction being provided for mounting the common carrier to the frame.

8 Claims, 2 Drawing Figures

CULTIVATING IMPLEMENT FOR AGRICULTURAL SOIL

This invention relates to a cultivating implement for agricultural soil, especially a harrow for seedbed preparation, the teeth of which are fashioned to be resilient and are attached to a frame.

For seedbed preparation, it is necessary to provide a uniformly deep, crumbly layer of soil over the entire area of a plowed field. Therefore, all of the processes for soil cultivation by means of which the seedbed is to be prepared are directed toward attaining this objective. In this connection, it is conventional to employ, additionally to rotary hoes used to a smaller extent, primarily soil cultivators having rigid or simply sprung tools of the aforementioned type mounted on or within the frame. The minimum working depth attainable, at which the composite of teeth still leaves a coherent, crumbly soil layer rather than merely individual scratches in the surface of the soil is dependent on the lateral interspace between the teeth (the so-called row spacing). Teeth which are spaced far apart must bite into the soil more deeply than teeth in close proximity to one another, in order to leave a coherent, crumbly soil cover on the surface. Consequently, for seed fruit, the thickness of the crumbly layer of soil corresponding to the seeding depth, for example, must be very minor, because such seed fruit has a lower germinating energy and thus must not be seeded at too great a depth. For such a seedbed preparation, harrows are known with rigid or resilient teeth. These have the narrow lateral tooth spacing and thus provide the desired, shallow soil cultivation if care is taken to effect a uniform harrowing depth and soil adaptation. However, one disadvantage of these harrows resides in the relatively great danger of clogging if vegetable residues are present in the ground. These vegetable residues wind around the teeth and are shifted upwardly along the respective tooth until they contact the frame carrying the teeth, where the residues are accumulated. As long as the soil is extensively free of vegetation, this occurs only at individual teeth and does not greatly impair the operations. However, as soon as larger amounts of such vegetation residues are in the soil, several teeth pick these up, and it is unavoidable that when two neighboring teeth entrain such vegetable residues, also the interspace therebetween is immediately bridged by further vegetable matter, hard earth clods, or rocks, so that the entire composite of teeth is clogged up in no time at all.

Another disadvantage of the conventional harrows is the relatively great danger of breakage or bending of the rigid or resilient working implements on a rocky soil.

Therefore, it is an object of this invention to provide a cultivating implement for agricultural soil, especially a harrow for seedbed preparation, which does not exhibit these disadvantages and is suitable for soils interspersed with vegetable matter for seedbed preparation.

The invention resides in arranging the harrow teeth at least respectively in pairs at a common carrier, the latter being, in turn, resiliently mounted to the frame. This construction has the advantage that the harrow teeth are extensively protected from breakage in a rocky field in that the teeth are not attached rigidly or with simple resiliency to the frame, but rather are secured by an additional spring mechanism in addition to their own resiliency. This double-resilient arrangement also results in a stronger vibration of the ends of the harrow teeth, which are actually fashioned to be inherently resilient, while the teeth pass through the soil. This essentially improves the operating quality, on the one hand, and also results in the effect, on the other hand, that any vegetable matter possibly collected by the teeth from the ground is shaken off again.

The invention provides an especially advantageous construction by mounting the carrier to a spring element joined to the frame and extending in the downward direction, because this substantially increases the ground clearance of the harrow teeth as compared to harrows of a conventional structure. The carrier can suitably be disposed so that it extends in the cultivating direction, and the harrow teeth can be mounted respectively along the longitudinal sides of the carrier. If, in this embodiment, the carrier is attached with its front end to the spring element joined to the frame and fashioned as a coil spring, an especially advantageous construction is obtained with respect to the ground clearance and the thus-produced vibrations. If, in this embodiment, the vibrations should be insufficient to attain a self-cleaning action of the teeth, so that clogs occur around the groups of tools, then this construction provides the advantage, due to the concomitant, increased traction resistance, that the coil spring serving for the mounting of the carrier is resiliently bent rearwardly to such an extent that the ends of the working tools or teeth are pulled out of the soil to such a degree that the collected vegetable residues are shaken off by the teeth.

Also the thus-attained greater ground clearance of the carrying and pulling frame protects the implement extensively from being clogged with rocks, hard earth clods, and vegetable matter. Additionally, the advantage is obtained that the spacing between two working tools, as measured in the travel direction, as well as the lateral spacing therebetween can be dimensioned to be so narrow that the group of tools effects a laterally flowing motion of the soil, namely in the direction of the working tool mounted to the rear end of the carrier. As a consequence, the surface of the field is leveled more intensively with a corresponding arrangement of the tool groups in the frame. Such an arrangement cannot be obtained with the usual constructions and the thus-realized ground clearance; the advantageous system is only obtained by combining the individual working tools or harrow teeth into tool groups on carriers, which in turn are resiliently supported. In this connection, two or more harrow teeth can be located on a carrier, which can, in turn, be mounted to the coil spring by way of a readily detachable clamp. This carrier can also be provided, in turn, with holding fixtures on lateral arms to mount the harrow teeth.

Figure 2:
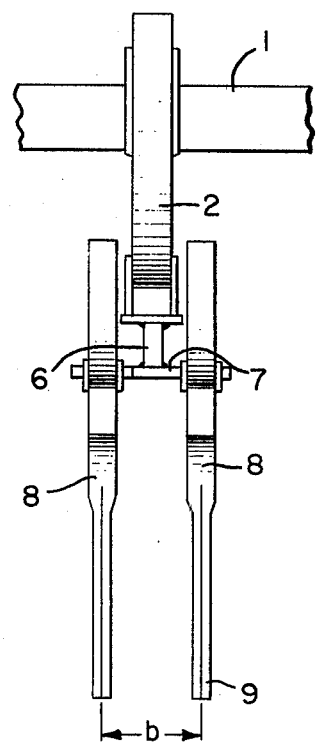

These and other objects, features and advantages of the present invention will become more apparent from the following description when taken in connection with the accompanying drawing which shows, for the purposes of illustration only, one embodiment of a cultivating implement in accordance with the present invention, and wherein:

FIG. 1 is a lateral view of a carrier equipped with two harrow teeth, this carrier being resiliently mounted to a supporting and drawing frame; and FIG. 2 shows a plan view in the direction indicated II—II in FIG. 1.

Referring now to the drawings, wherein like reference numerals are used in both views to designate like parts, the numeral 1 denotes a crossbar or cross beam of a frame, not shown in detail, consisting as usual of several crossbars and longitudinal bars holding these crossbars together. The entire frame, forming a harrow in conjunction with several of the tool units shown in FIGS. 1 and 2, is then hitched, for example, to a tractor. A coil spring 2 is attached to the crossbar 1 in the drawing; at the lower end 3 of this spring, a carrier generally designated by the reference numeral 4 extending longitudinally in the working direction is attached with an easily releasable clamping means. This carrier consists essentially of a longitudinally oriented flat iron 6, to the underside of which crossbars 7 are welded which laterally project toward the right-hand and left-hand sides, respectively (FIG. 2). Each of these flat irons serves, with mounting clamps, for attaching harrow teeth 8 likewise fashioned in the form of coil springs and conventionally designed at their lower ends 9 for seedbed preparation. To the aforementioned frame, not illustrated in the drawing, several of the tool group units shown in FIGS. 1 and 2 are then mounted so that a harrow system firmly joined to the frame is conventionally produced.

This construction has the advantage that the frame, which is arranged essentially horizontally at the level of the crossbar or cross beam 1, has a greater ground clearance than known harrow arrangements wherein the frame is disposed approximately at the location of the carrier 4. The total system is distinguished in that a very uniform soil working is attained, and that clogs at the harrow frame due to vegetable matter or the like are avoided, because the harrow teeth 8 themselves are fashioned to be elastically resilient, and furthermore the carrier 4 is capable of yielding upwardly in the rearward direction by the spring effect of the coil spring 2, without thereby driving the forward teeth attached thereto any further into the ground. This is essentially due to the mounting of the carrier 4 at the front end. Also, the total arrangement brings the advantage of providing greater vibrations during operation, which likewise results in a self-cleaning action of the teeth 8.

The advantage of the arrangement also resides in that the spacing $a$ as measured in the working direction, and the spacing $b$ as measured in a direction transversely to the former direction, can be dimensioned in spite of the high ground clearance of the frame 1 so that the requirements are met for an advantageous soil cultivation. The coil spring 2 can be designed with regard to its spring characteristics so that during normal cultivation the carrier 4 is likewise guided horizontally. Thereby, the cultivating conditions are met, and a deflection of the carrier can take place only if it encounters a substantial resistance.

What is claimed is:

1. Cultivating implement for agricultural soil, especially a harrow for seedbed preparation which includes a common carrier having a front end and a rear end and resilient harrow teeth attached to a frame,
    wherein the harrow teeth comprise helicoidal springs with the lower end of each helicoidal spring formed as a cultivating member and the harrow teeth are attached in at least pairs to the common carrier, the teeth of said at least pairs being attached near said rear end and intermediate said front and rear end, respectively, and the common carrier is attached to the frame by means of another helicoidal spring, said another spring including a first vertically directed end portion and a second vertically directed end portion, said first end portion being attached to said carrier at the front end of said carrier, said second end portion being attached to said frame, said first end portion being connected to said second end portion by an intermediate non-archimedean spiral portion of said another spring.

2. Cultivating implement according to claim 1, wherein the common carrier extends in a cultivating direction, and the harrow teeth are respectively attached along two longitudinal sides of the common carrier.

3. Cultivating implement according to claim 1, wherein a releasable clamp means is provided for mounting the helicoidal spring to the front end of the common carrier.

4. Cultivating implement according to claim 3, wherein laterally projecting arms are provided on an underside of the common carrier and in that mounting clamps are provided for mounting the harrow teeth to said laterally projecting arms.

5. Cultivating implement for agricultural soil, especially a harrow for seedbed preparation which includes a common carrier having a front end and a rear end and resilient harrow teeth attached to a frame,
    wherein the harrow teeth comprise helicoidal springs with the lower end of each helicoidal spring formed as a cultivating member and the harrow teeth are attached in at least pairs to the common carrier, the teeth of said at least pairs being attached near said rear end and intermediate said front and rear end, respectively, and the common carrier is attached to the frame by means of another helicoidal spring, said another spring having a first part extending vertically upwardly from the front end of said common carrier and a second part extending vertically downwardly from said frame and wherein said second part of said another helicoidal spring is attached to said frame at a point below the height of a portion of said another spring intermediate said first and second parts.

6. Cultivating implement according to claim 5, wherein the common carrier extends in a cultivating direction, and the harrow teeth are respectively attached along two longitudinal sides of the common carrier.

7. Cultivating implement according to claim 5, wherein a releasable clamp means is provided for mounting the helicoidal spring to the front end of the common carrier.

8. Cultivating implement according to claim 7, wherein laterally projecting arms are provided on an underside of the common carrier and in that mounting clamps are provided for mounting the harrow teeth to said laterally projecting arms.

* * * * *